Patented Jan. 26, 1954

2,667,473

UNITED STATES PATENT OFFICE 2,667,473

VINYL ACETATE-N-VINYL-PYRROLIDONE COPOLYMERS

Richard R. Morner, Dayton, Ohio, and Raymond I. Longley, Jr., Springfield, Mass., assignors to Monsanto Chemical Company, St. Louis, Mo., a corporation of Delaware No Drawing. Application February 8, 1952,
Serial No. 270,752

2 Claims. (Cl. 260—85.7)

The present invention relates to copolymerization products and more particularly provides new vinyl ester-N-vinyl lactam copolymers.

We have found that valuable polymerization products may be obtained by polymerizing a vinyl ester of a fatty acid of from 1 to 4 carbon atoms, e. g., vinyl formate, vinyl acetate, vinyl butyrate, in admixture with an N-substituted lactam, e. g., N-vinyl-2-piperidone, N-vinyl-2-pyrrolidone, N-vinyl-3,3-dimethylpyrrolidone, N-vinyl-6-caprolactam, N-vinyl-5-methylpyrrolidone, the N-vinyl-substituted lactam of 1-amino-8-naphthalenecarboxylic acid, N-vinylhexahydrophthalimidine, etc.

The present products are clear and transparent resinous materials which may be used for a variety of industrial purposes, e. g., as lubricant additives, coating materials, textile sizings, soil-conditioners, etc.; and they are particularly valuable as adhesives in the manufacture of laminated products such as plywood, safety glass, paper and/or textile laminates, etc.

Copolymers of particular utility as adhesive coatings are generally substantially water-insoluble copolymers in which the content of copolymerized N-vinyl lactam is, from, say, 40% to 90% and the content of copolymerized lower alkyl vinyl ester from 10% to 60%. Copolymers in which the N-vinyl lactam content is below, say, 40%, and preferably from 10% to 35% by weight of the weight of the copolymer are useful as soil additives. Of particular utility as soil-conditioning agents are those of the present vinyl ester-N-vinyl lactam copolymers which are water-soluble or which possess at least some degree of water-solubility.

In preparing the present vinyl ester-N-vinyl lactam copolymers, the two monomers are mixed together in suitable proportions and the resulting mixture is then readily polymerized by heat and/or catalyst to yield the copolymers. In general, copolymerization of the lower vinyl ester with the N-vinyl lactam yields copolymers having from 10% to 90% of copolymerized N-vinyl lactam and from 90% to 10% of copolymerized vinyl acetate.

Polymerization of mixtures of the vinyl ester and N-vinyl lactam generally results in the formation of interpolymers in which the content of copolymerized N-vinyl lactam is greater than that present in the monomeric mixture. This results in the depletion of the monomeric mixture with respect to the lactam and it is accordingly desirable for best results to maintain the concentration of the N-vinyl lactam in the mixture at a substantially constant value during polymerization.

The present copolymers may be produced either by the mass, solution or suspension polymerization methods. The copolymerization may be made to take place either in the absence of a catalyst or in the presence of a catalyst of polymerization, e. g., an oxygen yielding compound such as benzoyl peroxide, tert-butyl hydroperoxide, hydrogen peroxide, alkali metal or ammonium salts of peroxy acids such as sodium perborate or ammonium persulfate, etc. Particularly valuable polymerization catalysts are the azo type catalysts, e. g., $a,a'$-azodiisobutyronitrile, dimethyl $a,a'$-azodiisovalerate, $a,a'$-azodiisobutyramide, etc. The polymerization catalysts are employed in concentrations which have been previously found to promote polymerization reactions, i. e., in concentrations of from, say, 0.01 to 5.0 per cent by weight of the monomeric material.

The invention is further illustrated, but not limited, by the following examples:

Example 1

A mixture of 2.5 g. of N-vinyl-2-pyrrolidone and 7.5 g. of vinyl acetate was dissolved in 50 g. of benzene and 0.05 g. of azo-bis-isobutyronitrile was added as catalyst. The resulting solution was then agitated, in a nitrogen atmosphere, at a temperature of 60° C. for a period of 48 hours. At the end of that time the reaction mixture, a clear, colorless liquid was poured into hexane. The resulting precipitate was filtered and dried to yield a moderately water-soluble white powder having a softening point of 87° C. Analysis of this product gave a nitrogen content of 4.54% showing the presence of approximately 36% of copolymerized N-vinyl-2-pyrrolidone. Very small quantities of the copolymer may be incorporated into clay or silty loam soils for increasing aggregation thereof and effecting porosity of structure.

Example 2

Vinyl acetate (7.5 g.), N-vinyl-2-piperidone (2.4 g.) benzene (50 g.) and 0.025 g. of azo-bis-isobutyronitrile as catalyst were charged to a reaction vessel. The vessel was swept out with nitrogen and sealed, and then placed on a rotating rack, and maintained thereon at 43 R. P. M. for a time of 20 hours at a temperature of 60° C. At the end of that time the reaction mixture was cooled and poured into 500 cc. of hexane. The resulting precipitate was filtered and dried to give a white, friable solid having a softening point of 94° C. Analysis of this product gave a nitrogen content of 4.53%, showing the presence of approximately 40% copolymerized N-vinyl-2-piperidone. The copolymer may be advantageously employed as the resinous component of adhesive coatings.

In place of vinyl acetate or in addition thereto, vinyl formate, vinyl propionate or vinyl butyrate may be similarly copolymerized with N-vinyl-2-piperidone or N-vinyl-2-pyrrolidone or other N-vinyl lactams, e. g., N-vinyl-6-caprolactam or N-vinyl-5-methylpyrrolidone.

A variety of methods may be utilized in applying the principle of our invention and the products produced thereby, the invention being limited only by the appended claims.

What we claim is:

1. The copolymer of vinyl acetate and from 10 per cent to 40 per cent by weight of said copolymer of N-vinyl-2-pyrrolidone.

2. The method of producing resinous products which comprises polymerizing a mixture containing vinyl acetate together with from 10 per cent to 40 per cent by weight of said mixture of N-vinyl-2-pyrrolidone.

RICHARD R. MORNER.
RAYMOND I. LONGLEY, Jr.

References Cited in the file of this patent

UNITED STATES PATENTS

| Number | Name | Date |
|---|---|---|
| 2,335,454 | Schuster et al. | Nov. 30, 1943 |
| 2,471,959 | Hunt | May 31, 1949 |
| 2,497,705 | Werntz | Feb. 14, 1950 |
| 2,520,959 | Powers | Sept. 5, 1950 |